(12) United States Patent
Seyer

(10) Patent No.: US 11,727,766 B2
(45) Date of Patent: Aug. 15, 2023

(54) DEVICES AND SYSTEMS FOR PAYMENT ENTRY AND GAMING FUNDS TRANSFER

(71) Applicant: JCM American Corporation, Las Vegas, NV (US)

(72) Inventor: Rainer Seyer, Kleinmachnow (DE)

(73) Assignee: JCM American Corporation, Las Vegas, NV (US)

( * ) Notice: Subject to any disclaimer, the term of this patent is extended or adjusted under 35 U.S.C. 154(b) by 0 days.

(21) Appl. No.: 16/986,060

(22) Filed: Aug. 5, 2020

(65) Prior Publication Data

US 2021/0082256 A1   Mar. 18, 2021

Related U.S. Application Data

(60) Provisional application No. 62/902,121, filed on Sep. 18, 2019.

(51) Int. Cl.
*G07F 17/42* (2006.01)
*G07F 17/32* (2006.01)

(52) U.S. Cl.
CPC .......... *G07F 17/42* (2013.01); *G07F 17/3209* (2013.01); *G07F 17/3216* (2013.01)

(58) Field of Classification Search
CPC .. G07F 17/3204; G07F 17/32; G07F 17/3202; G07F 17/42; G07B 1/00
See application file for complete search history.

(56) References Cited

U.S. PATENT DOCUMENTS

| | | | |
|---|---|---|---|
| 7,004,837 B1 | 2/2006 | Crowder, Jr. et al. | |
| 2002/0164044 A1* | 11/2002 | Long | H04R 1/028 381/388 |
| 2004/0204233 A1* | 10/2004 | Saffari | G07F 17/3244 463/25 |
| 2007/0060311 A1* | 3/2007 | Rowe | G07F 17/3251 463/25 |
| 2007/0060313 A1* | 3/2007 | Mathis | G07F 17/32 463/25 |
| 2007/0253065 A1* | 11/2007 | Doczy | G06F 1/1616 359/601 |
| 2009/0045255 A1* | 2/2009 | Adams | G07F 17/32 235/381 |

(Continued)

FOREIGN PATENT DOCUMENTS

| | | |
|---|---|---|
| CN | 107251104 A | 10/2017 |
| WO | 2002073501 A1 | 9/2002 |

OTHER PUBLICATIONS

International Search Report and Written Opinion dated Dec. 10, 2020 for PCT/US2020/051354 (21 pages).

*Primary Examiner* — Reginald A Renwick
(74) *Attorney, Agent, or Firm* — FisherBroyles, LLP; Rob L. Phillips

(57) ABSTRACT

A gaming funds transaction device is disclosed that includes a user interface device, and in some embodiments a keypad section having input keys and a display, by which a gamer may obtain a gaming ticket with value added using a credit or debit card. The gaming funds transaction device may have a communication link to a financial institution or another validation service to obtain validation of a request to charge a credit or debit card. The user interface device may be connected to an input and printing section by a flexible arm, or may be an integrated component.

16 Claims, 12 Drawing Sheets

(56) References Cited

U.S. PATENT DOCUMENTS

| | | | |
|---|---|---|---|
| 2015/0187177 A1* | 7/2015 | Warner | G07F 17/3244 |
| | | | 463/25 |
| 2016/0093166 A1 | 3/2016 | Panambur et al. | |
| 2018/0060851 A1* | 3/2018 | Govindarajan | G07G 1/12 |
| 2018/0308314 A1* | 10/2018 | Sanford | G06Q 20/18 |
| 2018/0374277 A1* | 12/2018 | Kukita | G07D 9/00 |

* cited by examiner

DEVICES AND SYSTEMS FOR PAYMENT ENTRY AND GAMING FUNDS TRANSFER

CROSS-REFERENCE TO RELATED APPLICATION

This application is a nonprovisional of and claims the benefit under 35 U.S.C. § 119(e) of U.S. Provisional Patent Application No. 62/902,121, filed Sep. 18, 2019, the contents of which are incorporated herein by reference as if fully disclosed herein.

TECHNICAL FIELD

Embodiments described herein relate to electronic gaming devices or machines, and electronic cash, credit/debit card, or gaming ticket input/output devices. In particular, the disclosure relates to electronic devices and systems to facilitate payment from players for obtaining casino gaming tickets or credit for use with electronic gaming machines in a casino gaming environment.

BACKGROUND

A gaming industry entity, such as a casino, typically operates multiple electronic gaming machines. Such electronic gaming machines may accept wagers from users in any of a variety of forms, such as casino issued chips, credit cards, casino issued gaming tickets having a bar code, a magnetic strip or other printed form, or another form.

While casino issued chips are convenient for a user located at an electronic gaming machine, such as a slot machine, other records of value may be less bulky, and offer other conveniences. For example, a gaming ticket containing a magnetic strip or bar code containing a record of available cash value may be accepted by the electronic gaming machine, and may offer a player the convenience of transferring or reloading a cash value. The cash value may be reloaded or transferred to a gaming ticket, for instance, from a kiosk located in the casino and connected (such as through an internet connection) to banks or credit card companies, as well as a casino's accounting service (or "casino management system"). At such a kiosk, a user may be able to enter cash (bills or coins), casino chips, gaming tickets still having some residual cash value, or other sources, and obtain either a new gaming ticket with a cash value added, or an existing gaming ticket with an updated cash value. The kiosk may provide other services as well, such as redemption for casino chips.

A kiosk may need to be large to incorporate the various components, such as bill handling equipment, a credit card reader, a gaming ticket printer, computer or processing equipment, network connections, and the like. As such, while gaming tickets may in themselves be convenient, the kiosks for obtaining gaming tickets or adding value to gaming tickets may not be readily accessible to a player of a gaming machine.

SUMMARY

Some embodiments described herein generally reference an electronic device or system for obtaining a gaming ticket in a gaming establishment.

In a first embodiment, a gaming funds transaction device is disclosed. A first of three sections includes a credit/debit card reader; a printer component operable to print and eject a gaming ticket; and a processor operably linked with the credit/debit card reader and the printer component. The processor is operable to exchange messages with a validation service over a communication link. The second section is a keypad section that includes a numeric keypad, operational keys, and a display. The third section includes a connection arm linking the first section and the keypad section, and which contains an electronic link between the first section and the keypad section. The processor is operable to receive entries from the keypad section through the electronic link, transmit instructions to the keypad section that cause the display to show respective responses to the entries, obtain a validation response from the validation service of a charge request received from the credit/debit card reader to apply as a first cash value to the gaming ticket, and cause the printer component to print and eject the gaming ticket having a second cash value correlated to the charge request.

The keypad section may include a view shield, or may have a directional viewing screen. The connection arm may be flexible, and may extend through a housing of the gaming funds transaction device. The gaming funds transaction device may also include a cash acceptor. The first section of the gaming funds transaction device may also include a gaming ticket acceptor operably linked with the processor and configured to accept a used gaming ticket; the processor may be further operable to apply to the gaming ticket an amount related to a residual cash value of the used gaming ticket.

The processor may be further operable to receive an invalidation response to the charge request from the validation service, and transmit to the keypad section a corresponding instruction for the display to show a message related to the invalidation response. The processor may be further operable to exchange information regarding the cash value of the gaming ticket with an accounting service separate from the validation service.

In another embodiment, a system for dispensing electronic gaming tickets is disclosed. The system may include a credit/debit card reader, a user interface device, a gaming ticket printing device, and a processing component. The user interface device may include a keypad and a display. The gaming ticket printing device may be configured to print a gaming ticket usable in gaming machines. The processing component is operably linked with the credit/debit card reader, the user interface device, and the gaming ticket printing device, and includes a communication link with a validation service. The processing component may include a processor and a non-transitory memory that contains instructions which may cause the processor to receive a charge request from the credit/debit card reader, produce a prompt message on the display for a user input to be entered using the keypad, transmit the user input to the validation service, obtain at least one of a validation response and an invalidation response from the validation service, print a gaming ticket having a cash value based on the charge request in the case that a validation response was obtained, and produce an invalidity message on the display in the case that an invalidation response was obtained.

In the system, the communication link of the processing component with the validation service may be an internet connection. The credit/debit card reader and the user interface device may be contained in a common housing. The credit/debit card reader may include a magnetic strip reader and/or a chip reader. The user interface may include a QR code reader. The system may include a casino chip intake device operably linked with the processing component, wherein the instructions further cause the processor to apply additional cash value to the gaming ticket based on a casino chip received in the casino chip intake device. The system may include a cash acceptor operably linked with the processing component, wherein the instructions further cause the processor to apply additional cash value of the gaming ticket in an amount related to monies received in the cash acceptor.

The instructions may further cause the processor to exchange information regarding the cash value of the gaming ticket with an accounting service separate from the validation service. The system may be attached to a mobile device.

In another embodiment, an electronic credit/debit card reader is disclosed that includes a card insert reader that has an exterior opening on a side of the credit/debit card reader and configured to read information from at least one of a credit card or a debit card inserted into the exterior opening, a display, a keypad, a gaming machine link, an internet link separate from the gaming machine link, a processor, and non-transitory memory. The processor is operably connected to the card insert reader, the keypad, the display, the gaming machine link, and the internet link. The non-transitory memory includes instructions that, when executed by the processor, cause the processor to: receive a charge request from the card from the card insert reader, produce a prompt message on the display for a user input using the keypad, transmit the user input and charge request to a validation service using the internet link, obtain one of a validation response or an invalidation response from the validation service, and transmit a message to a computing unit of the gaming machine using the gaming machine link.

In further embodiments, the electronic credit/debit card reader may further include a wireless receiver configured to receive a charge request wirelessly transmitted from a mobile communication device of a user. The instructions may further cause the processor to send an alert message to the computing unit of the gaming machine when an invalidation response is received from the validation service.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
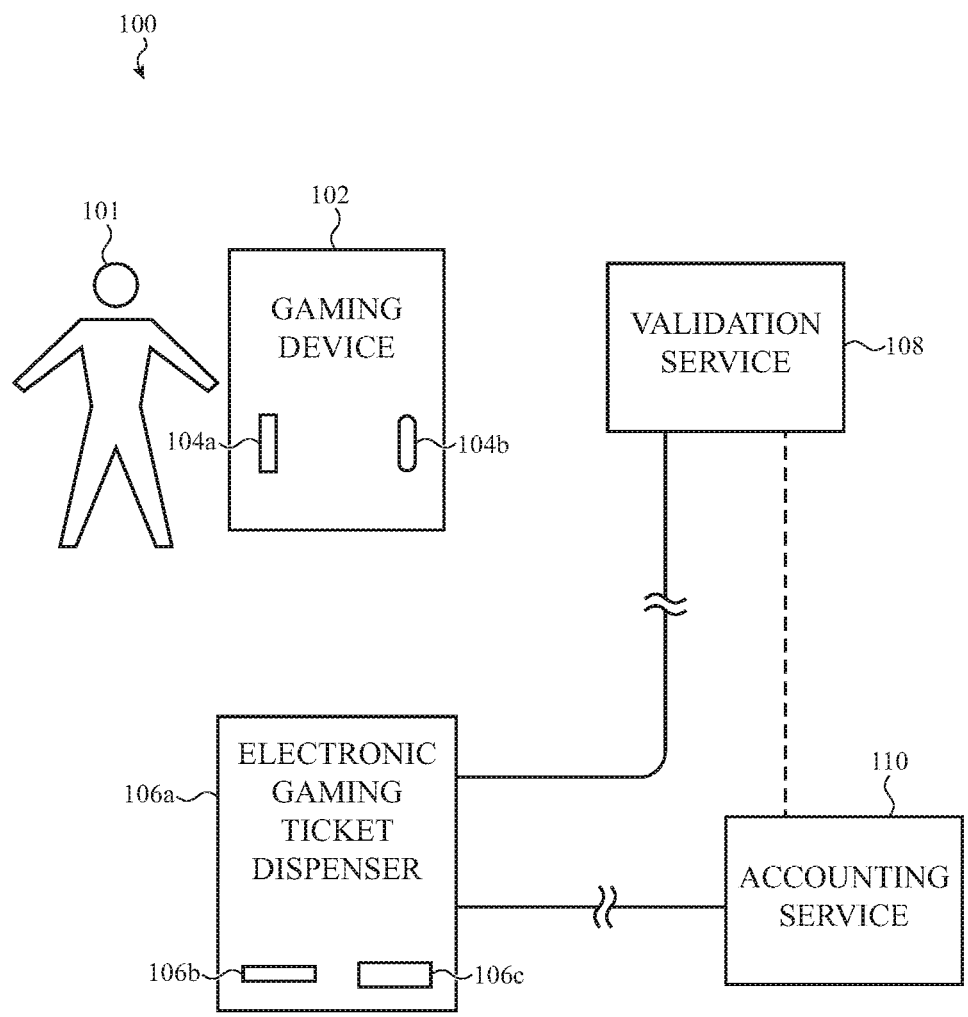
FIG. 1A shows a block diagram of various electronic devices that may operate in conjunction with a casino gaming device, according to an embodiment.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a gaming funds transaction device and a system for dispensing gaming tickets. Gaming tickets are provided by such devices to users to use as payment inputs for electronic gaming machines or gaming services (e.g., slot machines, table games, and so on) associated with a casino gaming environment.

For simplicity of description, this description herein references a "casino" as an example gaming industry entity in control of a casino gaming environment, although it is appreciated that this is merely one example. Similarly, for simplicity of description, the phrases "electronic gaming machine," "electronic gaming device," or just "gaming device," as used herein are generally understood to refer to a stationary slot machine within a casino. However, it may be understood that this is merely one example of an electronic gaming machine or gaming service. In other words, in some embodiments, other gaming industry entities and/or other stationary, portable, and/or digital (e.g., software-based) electronic gaming machines and/or services may be suitable for use with the various embodiments described herein and equivalents thereof.

A casino may have a number of electronic gaming machines, of various types, situated throughout the casino. A player or user may place a wager for each play of such an electronic gaming machine. The wager may be placed with a chip (specialized coin specific to the casino), or with an electronic gaming ticket. Such an electronic gaming ticket may be printed with a coding pattern (such as a bar code, QR code, or another code pattern) that allows the electronic gaming machine to read a cash value or other information from the coding pattern. An electronic gaming ticket may also be implemented virtually, in that an electronic signal or message is received from a gaming funds transaction device at which the user has supplied a cash value or equivalent.

Once a user inputs an electronic gaming ticket, whether physical or virtual, into an electronic gaming device, the cash value of the electronic gaming ticket may be credited for use on wagers. An electronic gaming ticket purchase and input to the electronic gaming device may be implemented virtually in one process, in which a user makes an electronic payment (such as by credit/debit card) at a gaming funds transaction device (which may be part of an electronic gaming device itself), with the payment both being recorded by an accounting service and in a user account or record on the electronic gaming device that the user may use for wagering.

A gaming device may accept such a gaming ticket and make its cash value available to the user for wagers on that gaming device. The cash value of a single gaming ticket may allow the user to make one or multiple wagers on the gaming device. At the end of a series of wagers, depending on the wins or losses of the user, there may be some remaining or residual cash value, which may be greater than the initial cash value of the gaming ticket if the user has been successful in wagering. A user may then cause the gaming device to eject either the same gaming ticket having a modified code indicating the residual cash value, a new gaming ticket, or another form of repayment of the residual cash value (such as a credit to an account of the user).

For simplicity and security of operations, a casino may have a limited number of gaming funds transaction devices at which users may obtain gaming tickets. A user typically pays for a gaming ticket by inserting cash bills or coins ("monies") into a cash acceptor of a gaming funds transaction device and receiving a gaming ticket printed by the gaming funds transaction device. Such gaming funds transaction devices may also have a casino chip intake device that accepts the casino's chips as inputs for adding cash value to be encoded on the gaming ticket. Also, such gaming funds transaction devices may have a gaming ticket acceptor that may allow residual cash value of a used gaming ticket to be added (or transferred) to a new gaming ticket. A gaming funds transaction device that accepts cash, chips, or used gaming tickets may be configured with storage spaces or mechanisms for such inputs, and this can add mechanical complexity and increase its size.

The embodiments described below include an intake configured to receive a credit card or debit card to allow a convenient payment option for a user to obtain gaming tickets. Hereinafter, such an intake will be referred to as a "credit/debit card reader." The credit/debit card reader may be configured to take some or all of the various brands of credit cards (Visa®, MasterCard®, Discover®, etc.), or just debit cards, or both credit and debit cards. The gaming funds transaction device may have a user interface, such as a keypad or touchpad, associated with the credit/debit card reader. A user may enter a request on the user interface to charge the credit or debit card a certain amount to be added to a cash value of a gaming ticket to be printed by the gaming funds transaction device.

As a security measure, a gaming funds transaction device may require a verification or validation of such a charge request from the user. This may involve a request to the user, as may be displayed on the user interface, to enter a PIN or another identifier (such as a password). Some embodiments of gaming funds transaction devices may use bio-authentication from the user. Examples of devices for such bio-authentication include, but are not limited to, voice/speech recognition hardware (e.g., microphone and signal processors), a camera to make retinal scans of a users' eyes or to perform facial recognition, fingerprint readers, or other bio-authentication devices.

To obtain the verification, the gaming funds transaction device may have a communication link with a validation service, such as a credit card company, an issuer of a debit card, a third party verifier such as PayPal®, and the like. The charge request may be submitted by the gaming funds transaction device to a validation service over the communication link. The gaming funds transaction device may then receive a validation response that the charge request is valid and accepted, or that it is invalid (such as due to being over a debit card's value or a credit card's credit limit, the card account being closed, the card having been reported stolen, or the like).

A gaming funds transaction device having a credit/debit card reader may be mounted on a mobile platform to provide easier accessibility to users on a casino's gaming floor. In one example, the gaming funds transaction device may include just the credit/debit card reader and a printer component, and be configured to be carried by a casino representative. The gaming funds transaction device may have a wireless communication link (such as Wi-Fi, Bluetooth, infrared, and the like) to one or more receivers in the casino, with the receiver communicatively linked with the validation service.

In some embodiments, the gaming funds transaction device may be a component of an electronic gaming device itself, whether as a designed-in component or as an installed or retrofitted separate component. In such embodiments, the gaming funds transaction devices may be connected to buttons of the electronic gaming device normally used for wagering or play on the electronic gaming device. When a user wishes to obtain a gaming ticket, the gaming funds transaction device may be activated or accessed, and those buttons may then allow for user interface with the gaming funds transaction device. In such embodiments the gaming funds transaction devices may also be connected to a gaming display screen of the electronic gaming device normally used to present the electronic gaming device's wagering game. When a user wishes to obtain a gaming ticket, the gaming funds transaction device may be activated or accessed, and the gaming display screen may be used for information exchange between the user and the gaming funds transaction device.

The gaming funds transaction device may also be communicatively linked with an accounting service of the casino so that the received and dispensed payments at the gaming funds transaction device, however made by the users, are accurately recorded for regulatory compliance.

In various embodiments, a gaming funds transaction device may be configured with the credit/debit card reader and printer component in a first section, and the keypad or user interface in another section, and with a connection arm (or cable, wires, or other connector) providing a power and/or communication link between the first section and the user interface section. This may allow for easier installation or retrofit, such as into an earlier model gaming ticket dispenser without a credit/debit card reader. It may also allow for placement of the keypad or user interface at a location on the gaming funds transaction device that is less visible to other persons in the casino.

These and other embodiments are discussed below with reference to FIGS. 1A-4.

FIG. 1A shows a relational diagram 100 of various devices and machines such as may be located in a casino, such as on a gaming floor. A user 101 may interact with an electronic gaming device 102, which may be a slot machine, a video poker machine, or another gaming device that accepts wagers from the user 101. The electronic gaming device 102 may have various intakes for receiving payments for wagers. One such payment intake is gaming ticket reader 104a that accepts printed gaming tickets that the user may obtain from gaming funds transaction device 106a. The electronic gaming device 102 may also include a casino chip intake 104b that accepts casino chips as payment for wagers.

The gaming funds transaction device 106a may be located at a convenient location in the casino for access by the user 101. The gaming funds transaction device 106a may be configured to accept various payments from the user 101 and print gaming tickets with a cash value related to the payments received. The cash value may be less than the payments received due to a fee charged for printing of the gaming ticket. Alternatively, the cash value may be more than payments received as an incentive for the user 101 to use gaming tickets rather than casino chips.

The gaming funds transaction device 106a is shown with credit/debit card reader 106b that may accept credit cards and/or debit cards to receive payments toward a gaming ticket. The gaming funds transaction device 106a also has a dispenser slot 106c through which a printed gaming ticket is dispensed to the user 101. The gaming funds transaction device 106a may include various other components as will be explained in more detail in relation to FIG. 2.

The gaming funds transaction device 106a may have a communication link 112 with a casino accounting service 110. The casino accounting service 110 may receive messages over the communication link 112 from the gaming funds transaction device 106a about payments received by the gaming funds transaction device 106a and cash value of gaming tickets that are printed, among other operations. The casino accounting service 110 may be separated from the gaming floor within the casino, or may be in a location separate from the casino. The casino accounting service 110 may also maintain or have access to a casino credit account of the user 101. The user 101 at the gaming funds transaction device 106a may be able to access that casino credit account via messages from the casino accounting service 110 over the communication link 112 to apply as payment toward a gaming ticket.

The gaming funds transaction device 106a may also have a communication link 114 with a validation service 108. The validation service 108 may provide authentication or validation of requests to charge a credit or debit card (or simply "charge requests") received by the gaming funds transaction device 106a. The validation service 108 may be located at a facility separate from the casino, and may be a separate commercial entity. Examples of validation services 108 include a debit card data center, a credit card data center, PayPal®, or another financial service. The validation service 108 may optionally have a communication link 116 with the casino accounting service 110 to provide information regarding validation (or invalidation) of charge requests received from the gaming funds transaction device 106a.

The communication links 112 and 114 may be any of a wireless link, a cable (such as coax, twisted pair, fiber optic, etc.) or other means. Messages sent on either of the communication links 112 and 114 may use encryption or other security measures.

Figure 1B:
FIG. 1B illustrates two examples of gaming tickets that may operate with a casino gaming device, according to various embodiments.
Figure 1B:
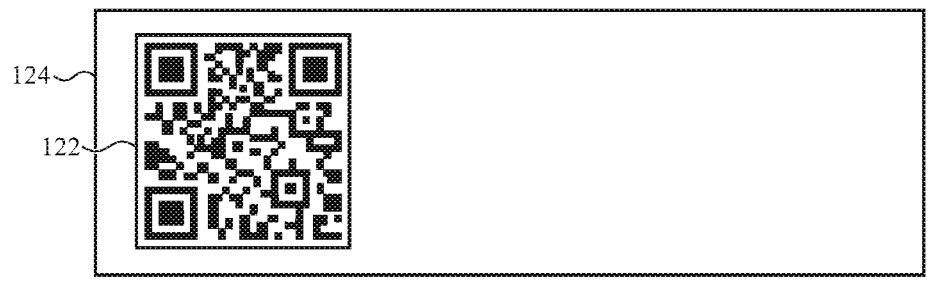

FIG. 1B illustrates two specific types of gaming tickets that may be provided by the gaming funds transaction device 106a. The gaming ticket 120 may be paper or another material on which is printed a bar code 122. The gaming ticket 124 may be paper or another material on which is printed a QR code 126. It will be understood that another coding type may be used.

The bar code 122 on the gaming ticket 120, or the QR code 126 on the gaming ticket 124, may be produced by a printer device that is part of a gaming funds transaction device 106a. The printer may be a thermal printer, dot matrix printer, inkjet or laser jet printer, or another type. The bar code 122, or the QR code 126, may contain information related to a cash value to be read by the electronic gaming device 102, and may also include other information (such as time and/or date of issue, identifier for the gaming funds transaction device 106a, or other information).

Figure 1C:
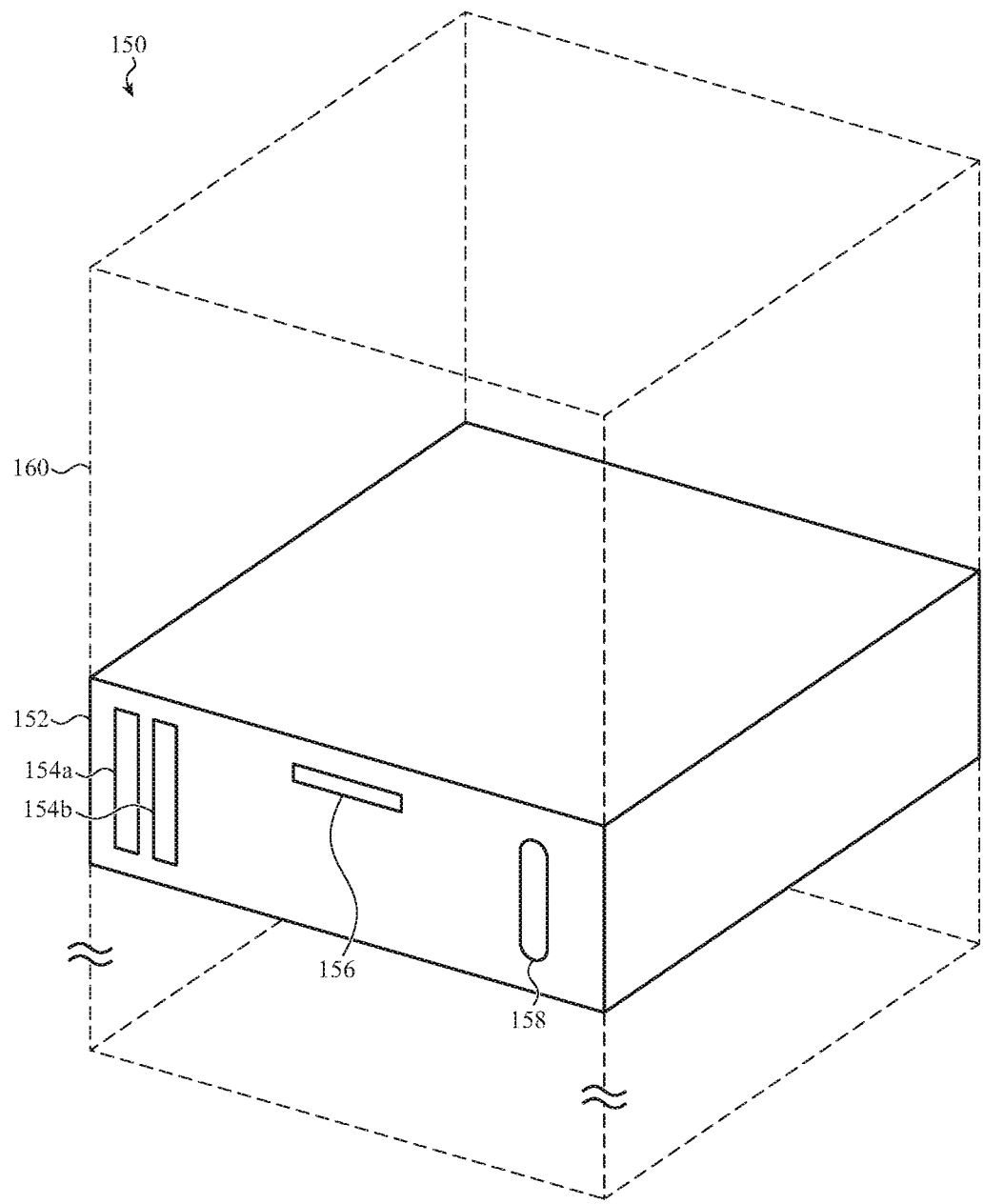
FIG. 1C illustrates an example of a gaming funds transaction device configured to receive different types of payment inputs, according to an embodiment.

FIG. 1C shows one configuration 150 of a gaming funds transaction device 152 as it may be positioned within a larger payment and redemption device 160, such as kiosk. FIG. 1C also shows how the gaming funds transaction device 152 may be positioned within an electronic gaming device. The payment and redemption device 160 may include mechanical and electronic components for handling monies and casino chips (such as secure cash boxes, tamper proof chip containers, etc.).

The gaming funds transaction device 152 includes a bill (cash) acceptor 156 and a coin acceptor slot 158. The bill acceptor 156 may function as a bill validator that tests inserted bills for counterfeit or another status precluding its acceptance. The gaming funds transaction device 152 may also include another slot (not shown) for accepting casino chips. The gaming funds transaction device 152 includes a gaming ticket intake 154a and a gaming ticket dispensing slot 154b. The gaming funds transaction device 152 may be able to accept a previously issued gaming ticket in the gaming ticket intake 154a as well as bills, coins, or casino chips, as payment toward a gaming ticket, which it can print and then eject through the gaming ticket dispensing slot 154b.

The embodiments described below show variations on the gaming funds transaction device 152 that are configured with a credit/debit card reader. Such credit/debit card readers may allow the payment and redemption device 160 to be reduced in size, as less cash and/or casino chip storage capacity may be needed. This may allow more payment and redemption devices 160 to be located on the casino gaming floor, improving user experiences.

Figure 1D:
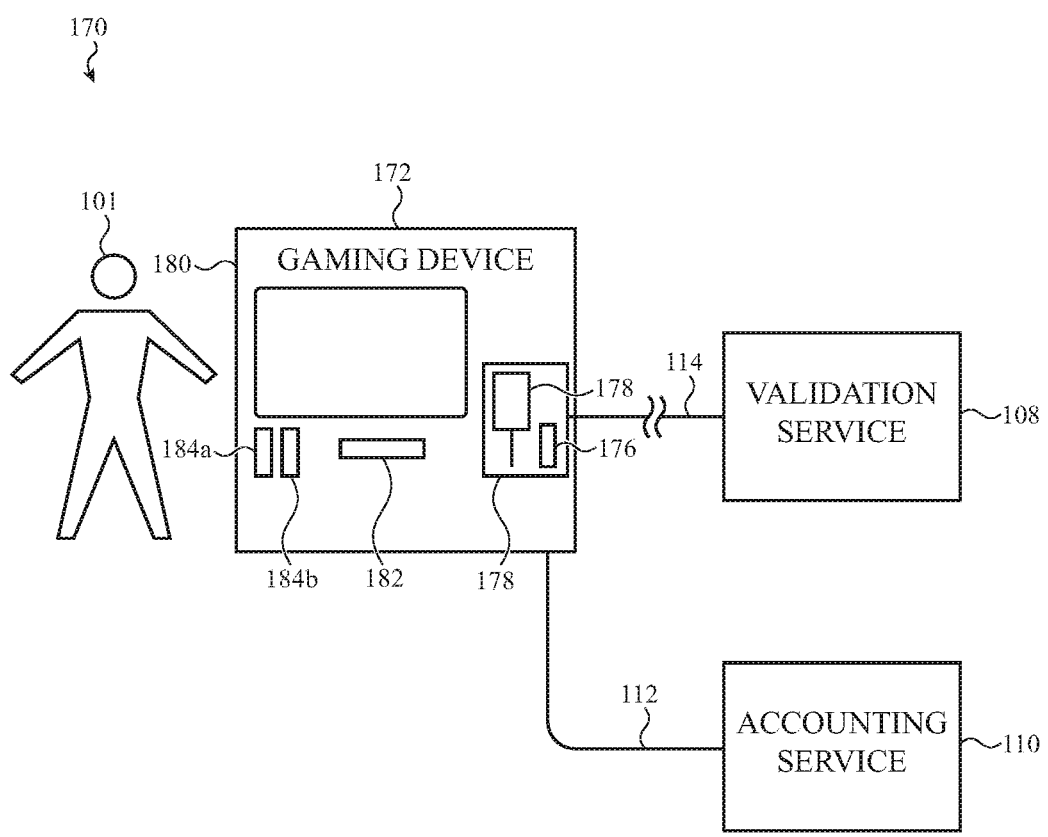
FIG. 1D illustrates a casino gaming device having an attached credit/debit card reader for adding wagering credit, according to an embodiment.

FIG. 1D shows a relational diagram 170 of a gaming machine 172 to other devices and machines such as may be located on a casino gaming floor. The gaming machine 172 may be a slot machine, a video poker machine, another type of electronic gaming machine, or the like. The gaming machine 172 may include a visual display 180, such as may display a hand of cards on a video poker machine, three outcomes on a play of an electronic slot machine, value in a user's account, or other information. It is to be understood that the gaming machine 172 may contain other components as may be needed for its operation that are not shown, such as power supplies, cash or casino chip handling equipment, processors, communication links, and the like.

The gaming machine 172 may have been manufactured with a gaming ticket intake 184a and a gaming ticket dispensing slot 184b. Also, the gaming machine 172 may have been manufactured with additional components for receiving payments from a user for placing wagers with the gaming machine 172. As an example, the gaming machine 172 includes a bill (cash) validator 182. In some embodiments, the gaming machine 172 may also have been manufactured with a casino chip acceptor (not shown).

The gaming ticket intake 184*a* and the gaming ticket dispensing slot 184*b* may be components of a gaming funds transaction device that itself may be a component of the gaming machine 172. As such, the gaming funds transaction device may also have as a component the credit/debit card reader 174, as described next.

In the embodiment shown in FIG. 1D, the gaming machine 172 has been retrofitted with a credit/debit card reader 174. In alternative embodiments, the gaming machine 172 may have been manufactured with the credit/debit card reader 174. As a separate component, the credit/debit card reader 174 may be compact and able to be placed in the gaming machine 172 separate from other payment intake components, such as the gaming ticket intake 184*a* and the gaming ticket dispensing slot 184*b*. This may allow for ease of manufacturing the gaming machine 172 or ease of retrofitting the gaming machine 172 with the credit/debit card reader 174. Further details of the credit/debit card reader 174 will be presented below.

The credit/debit card reader 174 may include a credit or debit card slot 176 into which a user inserts the card. The credit or debit card slot 176 may be configured to read a magnetic strip or an electronic chip on a credit or debit card. The credit/debit card reader 174 may also include a magnetic strip reader through which a user slides the card. The credit/debit card reader 174 may also be configured with an antenna or other hardware for communication with a user by means of radio frequency identification technologies or other types of near field communication technologies.

The credit/debit card reader 174 may also include a display 178 on which information may be presented to a user, such as instructions for use, dollar amount requested by the user to be charged to the credit or debit card, requests for PIN or other inputs, and other information. The display 178 may be or include a touchscreen on which a user may enter information. The display 178 may be an existing component of the gaming machine 172, such as a service display screen by which authorized casino workers can access and interact with the gaming machine 172. The credit/debit card reader 174 (or a gaming funds transaction device of which the credit/debit card reader 174 is a component) can then be communicatively linked with such a pre-existing display 178 to reduce complexity. The credit/debit card reader 174 may also include a keypad (not shown) separate from the display 178 on which a user may enter information.

In some embodiments, the credit/debit card reader 174 may be connected to the gaming display screen 179 of the gaming machine 172 in place of, or in addition to, the display 178. The gaming display screen 179 may be how the gaming machine 172 presents its wagering game to a user. The credit/debit card reader 174 may be connected to the gaming display screen 179 by one or more coax cable, wires, fiber optics, near field electromagnetic links, or another connection. The credit/debit card reader 174 may be equipped with one or more processors or processing components that cause visual outputs and/or requests for inputs to be shown on the gaming display screen 179. The gaming display screen 179 may itself be a touch screen display, capable of accepting press inputs from users, which may then be transmitted as signals to the processors or processing components.

The credit/debit card reader 174 may be configured to connect with a communication link 114. The communication link 114 may be an internet link to the credit or debit card validation service 108, as described previously. The credit/debit card reader 174 may also be configured to send validation requests or other information to the credit or debit card validation service 108, and receive validation or invalidation responses, or other information, from the credit or debit card validation service 108 over the communication link 114.

The credit/debit card reader 174 may be configured to send information regarding a user's charge requests, whether validated or invalidated by the validation service 108, and other information regarding a user's account, to the casino accounting service 110 over the communication link 112. The credit/debit card reader 174 may provide such information to a processor within the gaming machine 172, which then provides the information to the casino accounting service 110 over the communication link 112.

Figure 2:
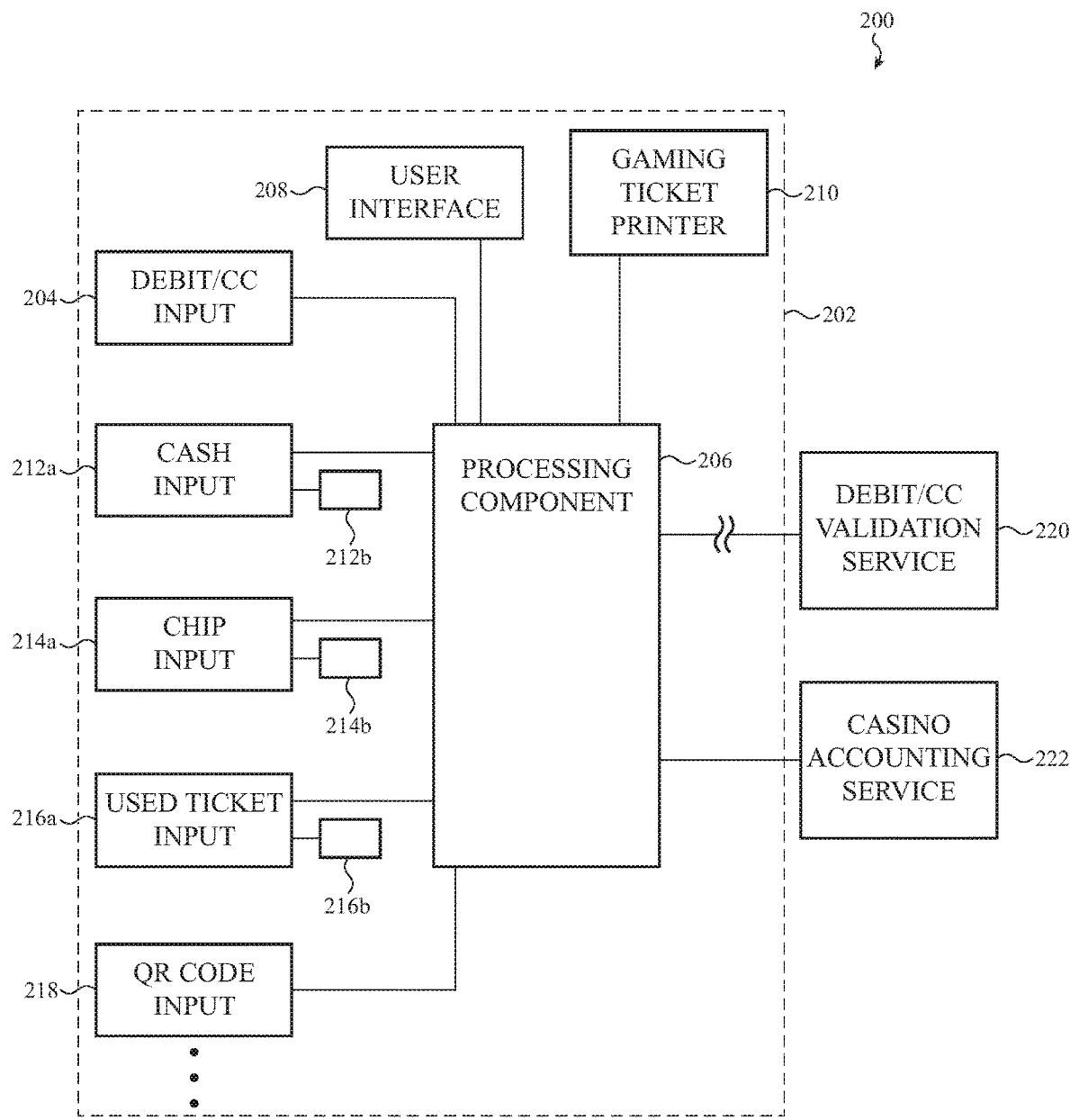
FIG. 2 is a block diagram of components that may be included in various embodiments of a gaming funds transaction device, linked with external services.

FIG. 2 shows a block diagram of a system 200 for a gaming funds transaction device 202. It will be understood that FIG. 2 is exemplary, and is intended to show some of the operational interconnections between the components, and that various embodiments of such systems may not include all the components now to be described.

The gaming funds transaction device 202 may have a communication link 226 to a casino accounting service 222, as described above. Also, the gaming funds transaction device 202 may have a communication link 224 to a credit/debit card validation service 220, also as described above.

The gaming funds transaction device 202 has a gaming ticket printer 210 operable to print and dispense a gaming ticket to a user. The gaming tickets may be as described in relation to FIG. 1B. The gaming ticket printer 210 may be a thermal printer, dot matrix printer, inkjet or laser jet printer, or another type. In a first configuration, the gaming funds transaction device 202 may cause the gaming ticket printer 210 to print a physical gaming ticket and eject it to a user. As part of controlling the printing of such a physical gaming ticket, the gaming funds transaction device 202 may (e.g., for regulatory compliance) send a signal to a casino accounting service 222 providing information regarding the cash value of the gaming ticket that was ejected. In a second configuration, the gaming funds transaction device 202 may cause the gaming ticket printer 210 to physically print a gaming ticket but not eject it, and retain it internally. Such a retained gaming ticket may then be treated as an equivalent of an inserted bill. The second configuration may be used, for example, if the gaming funds transaction device 202 is a component of an electronic gaming device. A user may wish that the cash value of the gaming ticket be applied directly to an account stored on the electronic gaming device to be available for wagering, instead of having to receive a physical gaming ticket. In a third configuration, instead of printing and retaining a gaming ticket when a user wishes to apply cash value to the account stored on the electronic gaming device to be available for wagering, the gaming funds transaction device 202 may send corresponding signals directly to the electronic gaming device and the casino accounting service 222. In a fourth configuration, a user may make a payment amount to the gaming funds transaction device 202 using a credit/debit card. The gaming funds transaction device 202 then can credit that payment amount to the electronic gaming device to be available for wagering by the user, and send a signal equivalent to having received cash.

The gaming funds transaction device 202 may have any of various intakes by which a user can apply payments toward a gaming ticket. These may include a cash input 212*a*, that may receive bills and/or coins (monies) that are received into a secure container 212*b*. There may also be a casino chip input 214*a*, with the casino chips being received into another secure container 214b. There may also be a used gaming ticket input 216a, which places the used gaming tickets into another secure container 216b.

The gaming funds transaction device 202 includes a credit/debit card reader 204. The credit/debit card reader 204 may be configured to read one or both of a magnetic strip on a credit or debit card, or an electronic chip on the credit or debit card. A credit or debit card (or just "card") may be read by the credit/debit card reader 204 by means of swiping the card through a magnetic strip reader, by inserting an electronic chip end of the card partially into a slot, or by receiving the card in its entirety into the slot of the credit/debit card reader 204. In the last configuration, a card that is found to have been stolen or canceled may be retained by the gaming funds transaction device 202 and not returned to the user.

The gaming funds transaction device 202 may have a user interface 208 through which a user may interact with the gaming funds transaction device 202, and through which the gaming funds transaction device 202 may display messages to the user. The display may be any of: a dedicated display screen of the gaming funds transaction device 202, a gaming display screen 179 of an electronic gaming device, a service display screen of an electronic gaming device, or another display. The user interface 208 may include a keypad, which may have physical keys or buttons that a user presses, or may include a touchscreen that displays virtual keys or icons for a user to press. The buttons may be buttons of an electronic gaming device, as described previously. The user interface 208 may include bio-authentication components, as described previously, for verification of the user's identity.

The user interface 208 may be accomplished by electromagnetic communication between the gaming funds transaction device and a user's mobile electronic device, such as a smartphone, personal digital assistant, and the like.

The gaming funds transaction device 202 may also have a QR code reader 218 to which a user may present a QR code visually, such as from a cellphone display, for entry of a payment, a user identification, or other information. The QR code reader 218 may alternatively or additionally be configured to read a visual bar code, or configured to read another visually presented code. The QR code reader 218 may be included as part of the user interface 208.

The gaming funds transaction device 202 may also include other components or devices by which a user may make payments. Examples include near field communication technology devices, such as may be included in a user's cellphone. Other technologies for contactless payment and/or mobile payments may also be used. These may be included as part of the user interface 208.

The gaming funds transaction device 202 includes a processing component 206 that is linked to the credit/debit card reader 204, the cash input 212a, the casino chip input 214a, the used gaming ticket input 216a, the QR code reader 218, the user interface 208, and the gaming ticket printer 210 to coordinate their respective operations. The processing component 206 can include or can be communicably coupled to circuitry and/or logic components, such as a processor and a memory. The processing component 206 can be implemented as any device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the term "processor" or, more generally, "processing component" or "controller," refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing elements or combination of elements.

Operations that may be performed by the processing component 206 include recording payments received from a user through any of the credit/debit card reader 204, the cash input 212a, the casino chip input 214a, the used gaming ticket input 216a, and the QR code reader 218. The processing component 206 may cause the user interface 208 to display the value of the payments received, and prompt the user for further entries or actions, such as printing a gaming ticket, entering further payments, entering other information, or other entries from the user.

A user may insert a credit or debit card into the credit/debit card reader 204 in order to enter a charge request. The processor may detect the insertion of the card, and cause the user interface 208 to display a request for the user to enter certain information. This may include requesting the user to enter a personal identification number (PIN) associated with the card, or another form of security or identification information, such as an answer to a security question. Further information that may be requested of the user includes an amount to be charged to the credit or debit card.

After the user has made an entry of the requested information, the processing component 206 may obtain authorization or validation of the charge request by transmitting a message to the credit/debit card validation service 220. The credit/debit card validation service 220 may return a validation response to the processing component 206 in the case that the charge request may be applied to the account associated with the card. A corresponding result may be displayed to the user on the user interface 208. The processing component 206 may transmit a message to the casino accounting service 222 indicating the amount charged to the card.

If there is an issue with the charge request, such as an incorrect PIN or security information, or a requested charge amount exceeding a limit on the card, the credit/debit card validation service 220 may return an invalidation response to the processing component 206. The processing component 206 may then have the user interface 208 display an error message and/or prompt the user for further entries, such as reentry of the PIN, a different charge amount, or other information.

Embodiments of the system 200 may be implemented in various physical configurations, as will now be described.

Figure 3A:
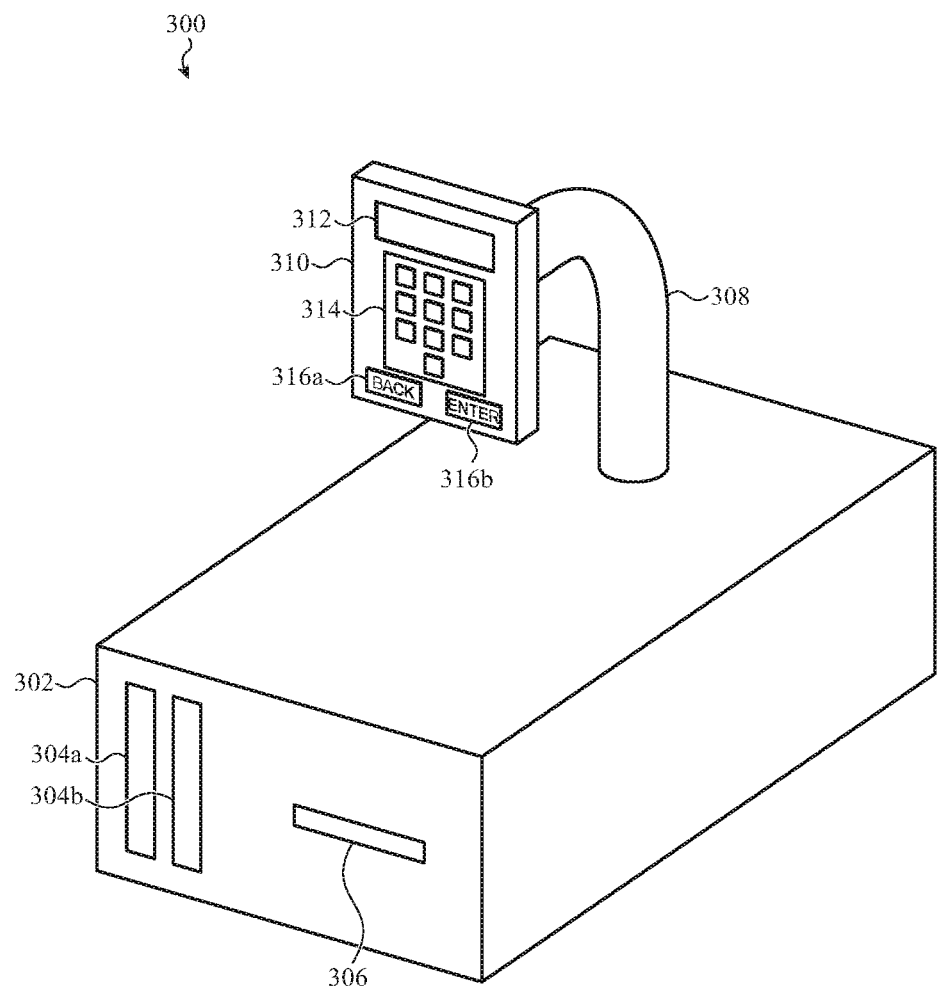
FIG. 3A shows a gaming funds transaction device operable to accept payment by a debit or credit card, according to an embodiment.

FIG. 3A shows a gaming funds transaction device 300 having three connected components. The gaming funds transaction device 300 includes the first section 302, a keypad section 310, and a connection arm 308 linking the first section 302 with the keypad section 310.

The gaming funds transaction device 300 is configured so that it can be either a component of a larger payment and redemption device, such as payment and redemption device 160 described above, or as a smaller unit in itself.

The first section 302 may include a gaming ticket ejection slot 304a through which a gaming ticket may be ejected to a user. A printer component (not shown) may be contained within the housing of the first section 302. The printer and the gaming tickets it produces may be as described in relation to FIG. 1B.

The first section 302 may also include a gaming ticket acceptor/reader 304b that can receive gaming tickets and read and apply any residual value on the received gaming ticket to a value available for a new gaming ticket.

The first section 302 may include a credit/debit card reader 306 into which a user may insert a credit or debit card, either wholly or in part. The credit/debit card reader 306 may include one or both of a card chip reader or a magnetic strip reader.

The keypad section 310 may contain a numeric keypad 314 and operational keys BACK 316a and ENTER 316b. These two operational keys are exemplary: in various embodiments, the keypad section 310 may contain more or fewer operational keys to allow additional and/or alternative input commands from a user. Further, the keypad section 310 may contain alphabetic keys. The keypad section 310 also includes a display 312 on which images or messages to the user may be presented. The messages may be indications of an entered PIN (e.g., a series of asterisks), amounts in the user's account, a current cash value available for a gaming ticket, or another message.

The keypad section 310 is electronically linked with the first section 302 by the connection arm 308. The connection arm 308 may be either rigid or flexible. The connection arm 308 may contain electrical wires, fiber optic cables, or other communication connections between the first section 302 and the keypad section 310. Having a connection arm to link the first section 302 with the keypad section 310 allows for a variety of configurations of the gaming funds transaction device 300 as a whole. For example, with a flexible connection arm, the gaming funds transaction device 300 may be added to a larger payment unit on a casino's gaming floor, with the first section 302 in a first location of the payment unit, and the keypad section 310 in a second location. It may be that neither location could accommodate both the keypad section 310 and the first section 302 or it may be that the second location for the keypad section 310 is at eye level and the first location for the first section 302 is at a lower level.

The first section 302 may include a processing component or processor as described above to coordinate operations with the keypad section 310, the printer component, and the credit/debit card reader 306. The processor may receive entries from, and transmit instructions to, the keypad section 310 over the electronic link within the connection arm 308.

The processor may have a first communication link with a validation service, as described above, to receive validation of a charge request entered by a user on the keypad section 310 for a credit or debit card inserted into the credit/debit card reader 306. The processor may have a second communication link with a casino accounting service, as described previously.

The gaming funds transaction device 300 may be mounted as a single unit on a mobile platform, such as a wheeled cart, to allow users to obtain new gaming tickets using just credit or debit cards, and/or current gaming tickets. Such a single unit may have a battery power source, and the first section 302 may have wireless transceivers to connect to fixed receivers in the casino to obtain communication links to the validation service and the casino accounting service. Such self-contained units may allow casino operators to move the gaming funds transaction device 300 near to more crowded sections of a gaming floor. In still another embodiment, the gaming funds transaction device 300 may be contained in a single case that is portable by a casino employee to provide a user with the ability to obtain gaming tickets without leaving the gaming machine.

Figure 3B:
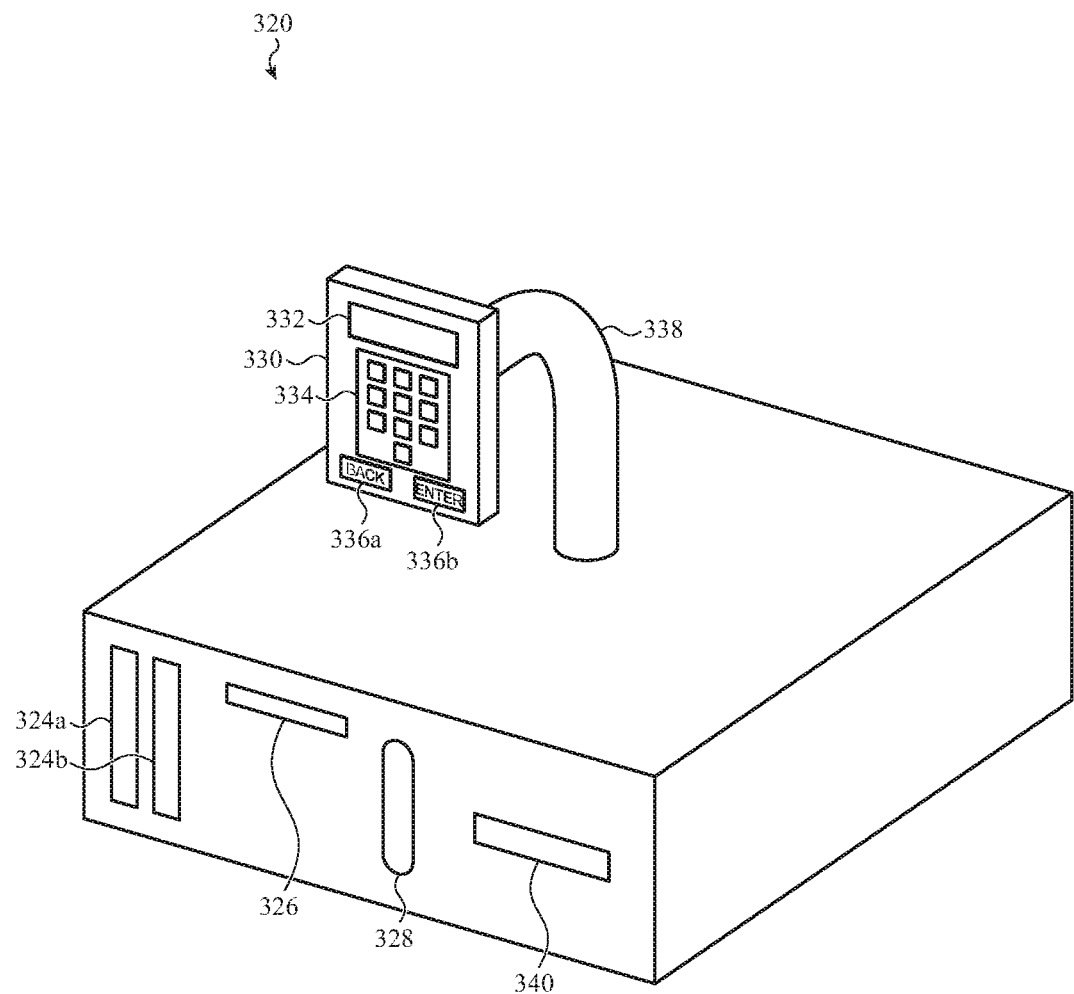
FIG. 3B shows a gaming funds transaction device connected to a keypad, and operable to accept payment by multiple methods, according to an embodiment.

FIG. 3B shows an embodiment of a gaming funds transaction device 320. The gaming funds transaction device 320 is similar to the embodiments described in relation to FIG. 3A. There is a first section 322, a keypad section 330, and a connection arm 338.

The keypad section 330 includes a display 332 on which messages may be displayed to a user, a numeric keypad 334, and operational keys 336a and 336b. As described above in relation to FIG. 3A, the keypad section 330 may contain more or fewer operational keys that may perform additional and/or alternative operations, and may also include alphabetic keys. The keypad section 330 may be implemented with physical keys or as a touch pad screen on which icons or keys are visually displayed.

The connection arm 338 may be implemented in any of the ways described above for the connection arm 308. The connection arm 338 may be rigid or flexible as desired for a particular application.

The first section 322 may include the components similar to those described above for the first section 302 of the gaming funds transaction device 300. There may be a gaming ticket ejection slot 324a through which a gaming ticket produced by a printer component (not shown) may be ejected to a user. The first section 322 may also include a gaming ticket acceptor/reader 324b that can receive gaming tickets and read and apply any residual value on the received gaming ticket to a value available for a new gaming ticket. The first section 322 may include a credit/debit card reader 340 into which a user may insert a credit or debit card, either wholly or in part. The credit/debit card reader 340 may include one or both of a card chip reader or a magnetic strip reader.

The first section 322 may further include a cash acceptor 326 to accept currency. The first section 322 may further include a coin acceptor 328. Alternatively or additionally, the first section 322 may include a casino chip acceptor.

The first section 322 may include a processor as described above to coordinate operations with the keypad section 330, the printer component, the credit/debit card reader 340 and the cash acceptor 326 and the coin acceptor 328. The processor may receive entries from, and transmit instructions to, the keypad section 330 over an electronic link within the connection arm 338.

The processor may have a first communication link with a validation service, as described above, to receive validation of a charge request entered by a user on the keypad section 330 for a credit or debit card inserted into the credit/debit card reader 340. The processor may have a second communication link with a casino accounting service, as described previously.

The gaming funds transaction device 320 may be configured for inclusion as part of a casino's larger payment and redemption device or kiosk. Alternatively, the gaming funds transaction device 320 may form a smaller self-contained unit that may occupy less room on a casino floor, and so allow for more such smaller units to be deployed by the casino.

Figure 3C:
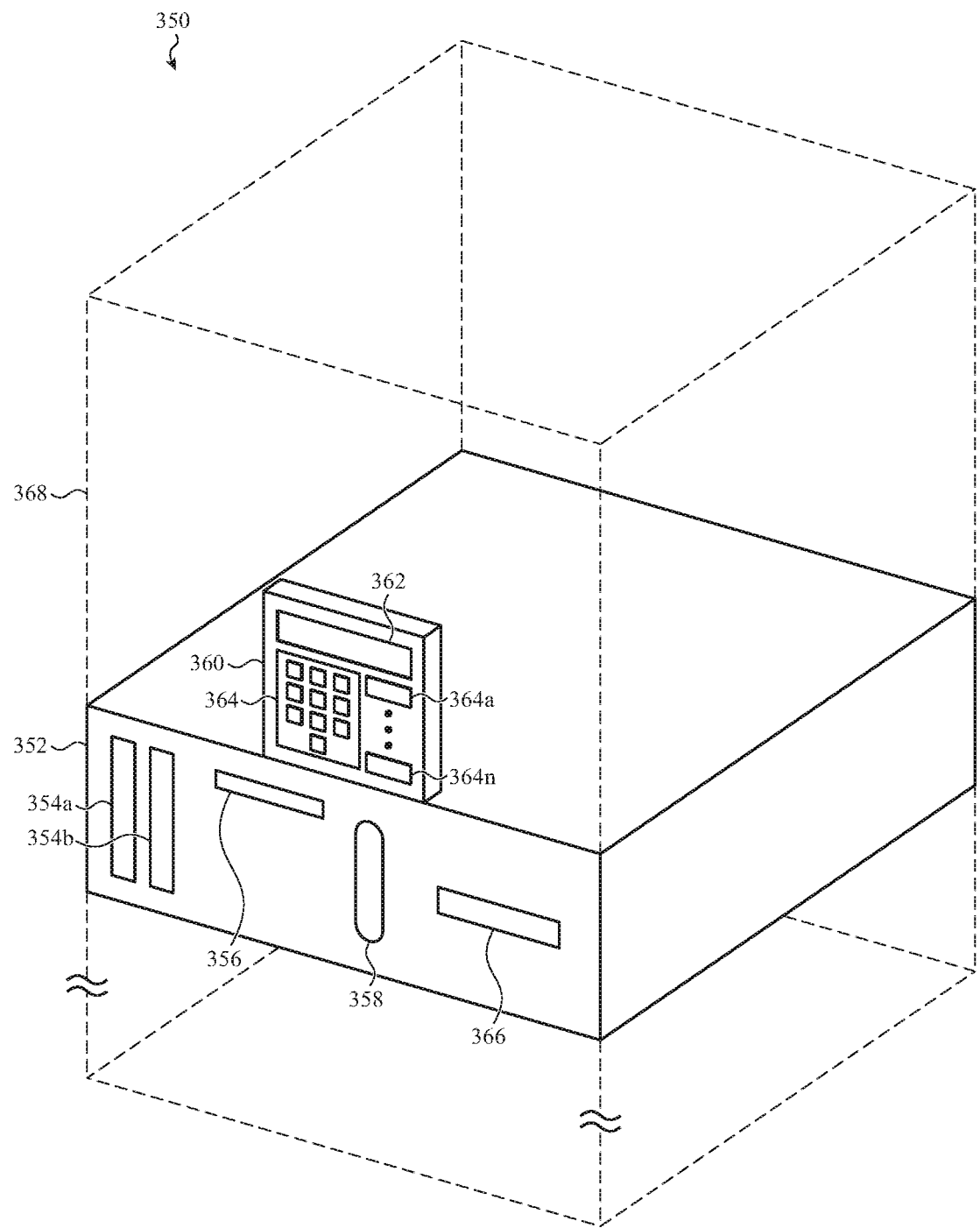
FIG. 3C shows a gaming funds transaction device with an attached keypad, and operable to accept payment by multiple methods, according to an embodiment.

FIG. 3C shows an embodiment of a gaming funds transaction device 350 that is configured with a larger housing 368. The larger housing 368 may include other components, sections, or devices.

The gaming funds transaction device 350 includes a first section 352 and an attached keypad section 360. In this embodiment there is no need for a connection arm to link the first section 352 and the keypad section 360, though there is an electronic connection between them.

The first section 352 includes a gaming ticket ejection slot 354a through which a gaming ticket produced by a printer component (not shown) may be ejected to a user. The first section 352 may also include a gaming ticket acceptor/reader 354b that can receive gaming tickets and read and apply any residual value on the received gaming ticket to a value available for a new gaming ticket. The first section 352 may include a credit/debit card reader 366 into which a user may insert a credit or debit card, either wholly or in part. The credit/debit card reader 366 may include one or both of a card chip reader or a magnetic strip reader. These components may be as described above in relation to FIGS. 3A-B. As with the embodiments described in relation to FIG. 3B, the first section 352 may further include a cash acceptor 356 to accept currency. The first section 352 may further include a coin acceptor 358. Alternatively or additionally, the first section 352 may include a casino chip acceptor.

The keypad section 360 includes a display 362 on which messages may be displayed to a user, a numeric keypad 364, and operational keys 364a through 364n. As described above in relation to FIGS. 3A-B, the keypad section 360 may contain more or fewer operational keys that may perform additional and/or alternative operations, and may also include alphabetic keys. The keypad section 360 may be implemented with physical keys or as a touch pad screen on which icons or keys are visually displayed.

The first section 352 may include a processor as described above to coordinate operations with the keypad section 360, the printer component, the credit/debit card reader 366, the cash acceptor 356, and the coin acceptor 358. The processor may receive entries from, and transmit instructions to, the keypad section 360 over an electronic connection.

The processor may have a first communication link with a validation service, as described above, to receive validation of a charge request entered by a user on the keypad section 360 for a credit or debit card inserted into the credit/debit card reader 366. The processor may have a second communication link with a casino accounting service, as described previously.

Figure 3D:
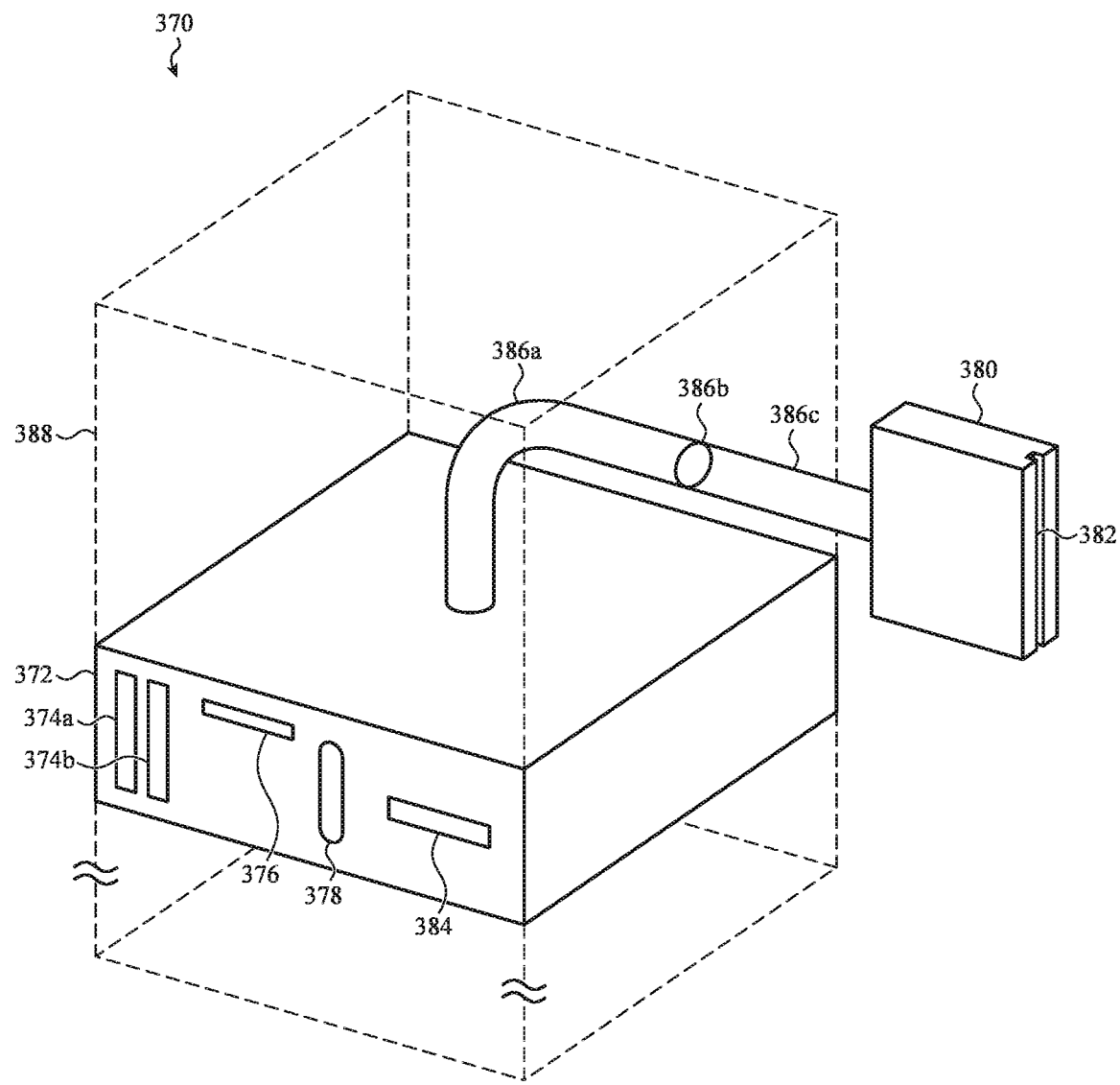
FIG. 3D shows a gaming funds transaction device having an exterior mounted keypad, and operable to accept payment by multiple methods, according to an embodiment.

FIG. 3D shows an embodiment of a gaming funds transaction device 370 that includes a first section 372 and a keypad section 380 that is mounted exterior to a housing 388. The first section 372 is electronically connected to the keypad section 380 by a first connection arm 386a interior to the housing 388 that extends from the first section 372 to a joint 386b on the housing 388, and by a second connection arm 386c that extends from the joint 386b to the keypad section 380. The joint 386b may allow the second connection arm 386c to pivot and move. For example, the joint 386b may be a socket joint into which fits a ball at the end of the second connection arm 386c. Such an embodiment may allow a user to position the keypad section 380 at a comfortable level, and to position the keypad section 380 for privacy.

The first section 372 may include some or all of the components described above for FIGS. 3A-C. In particular, the first section 372 includes a gaming ticket ejection slot 374a through which a gaming ticket produced by a printer component (not shown) may be ejected to a user. The first section 372 may also include a gaming ticket acceptor/reader 374b that can receive gaming tickets and read and apply any residual value on the received gaming ticket to a value available for a new gaming ticket. The first section 372 may include a credit/debit card reader 384 into which a user may insert a credit or debit card, either wholly or in part. The credit/debit card reader 384 may include one or both of a card chip reader or a magnetic strip reader. The first section 372 may further include a cash acceptor 376 to accept currency. The first section 372 may further include a coin acceptor 378. Alternatively or additionally, the first section 372 may include a casino chip acceptor.

The keypad section 380 may be similar to the keypad section 360 described in relation to FIG. 3C. In this embodiment the keypad section 380 may also include a magnetic strip reader 382 to allow a user to swipe a credit or debit card. In additional and or alternative embodiments, the keypad section 380 may also include a credit/debit card chip reader (not shown).

The first section 372 may include a processor as described above to coordinate operations with the keypad section 380, the printer component, the credit/debit card reader 384, the cash acceptor 376, and the coin acceptor 378. The processor may receive entries from, and transmit instructions to, the keypad section 380 over an electronic connection contained within the first connection arm 386a and the second connection arm 386c.

The processor may have a first communication link with a validation service, as described above, to receive validation of a charge request entered by a user on the keypad section 380 for a credit or debit card inserted into the credit/debit card reader 384. The processor may have a second communication link with a casino accounting service, as described previously.

Figure 3E:
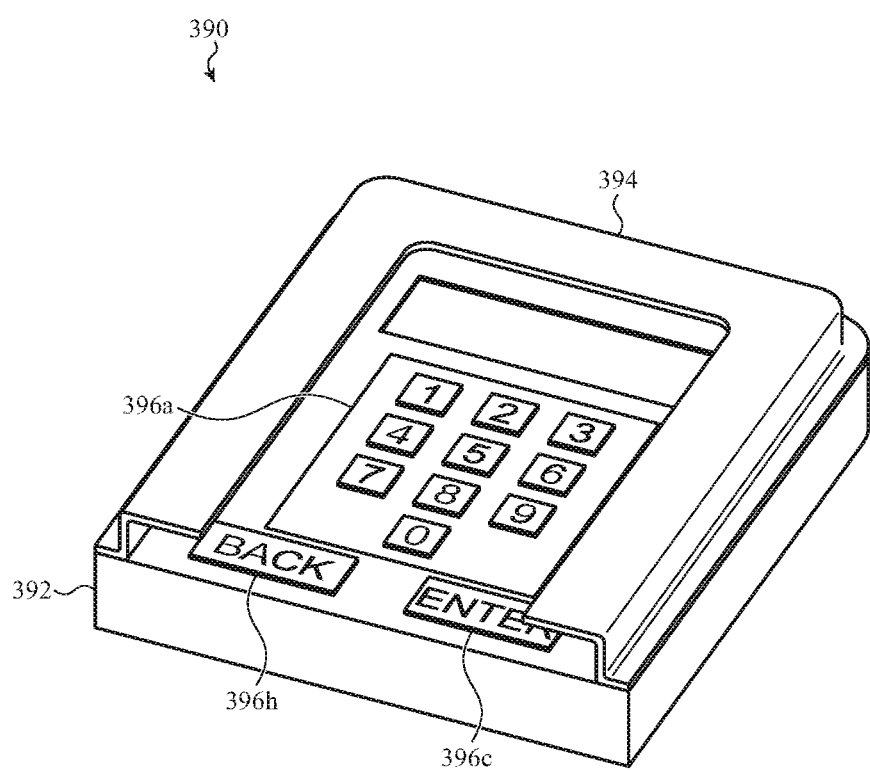
FIG. 3E shows a keypad having a view shield, according to an embodiment.

FIG. 3E shows an embodiment of a shielded keypad 390. The shielded keypad 390 includes a housing 392 that may include circuitry for receiving inputs from various keys. The shielded keypad 390 may include the numeric keypad 396a and one or more operational keys, such as the BACK key 396b, ENTER key 396c, and the CLEAR/CANCEL key 396d. In other embodiments, the shielded keypad 390 may include additional and/or alternative operational keys.

The shielded keypad 390 includes an exterior view shield 394 that extends from the housing 392. In the embodiment shown, the exterior view shield 394 extends around three sides of the housing 392 and reduces the direction from which a hand or finger on any of the keys 396a-c may be observed. The shielded keypad 390 also includes an alphanumeric, or other format, display 398 on which the key entries, or encrypted symbols, may be displayed.

In various embodiments, the shielded keypad 390 may be implemented as a touchpad displaying visual keys rather than physical keys. Such a touchpad embodiment may include a unidirectional display that allows the displayed images to be seen from a limited viewing angle. Such a unidirectional display may be implemented by a directional viewing screen placed on the touchpad. These embodiments may also include an exterior view shield 394.

Figure 4A:
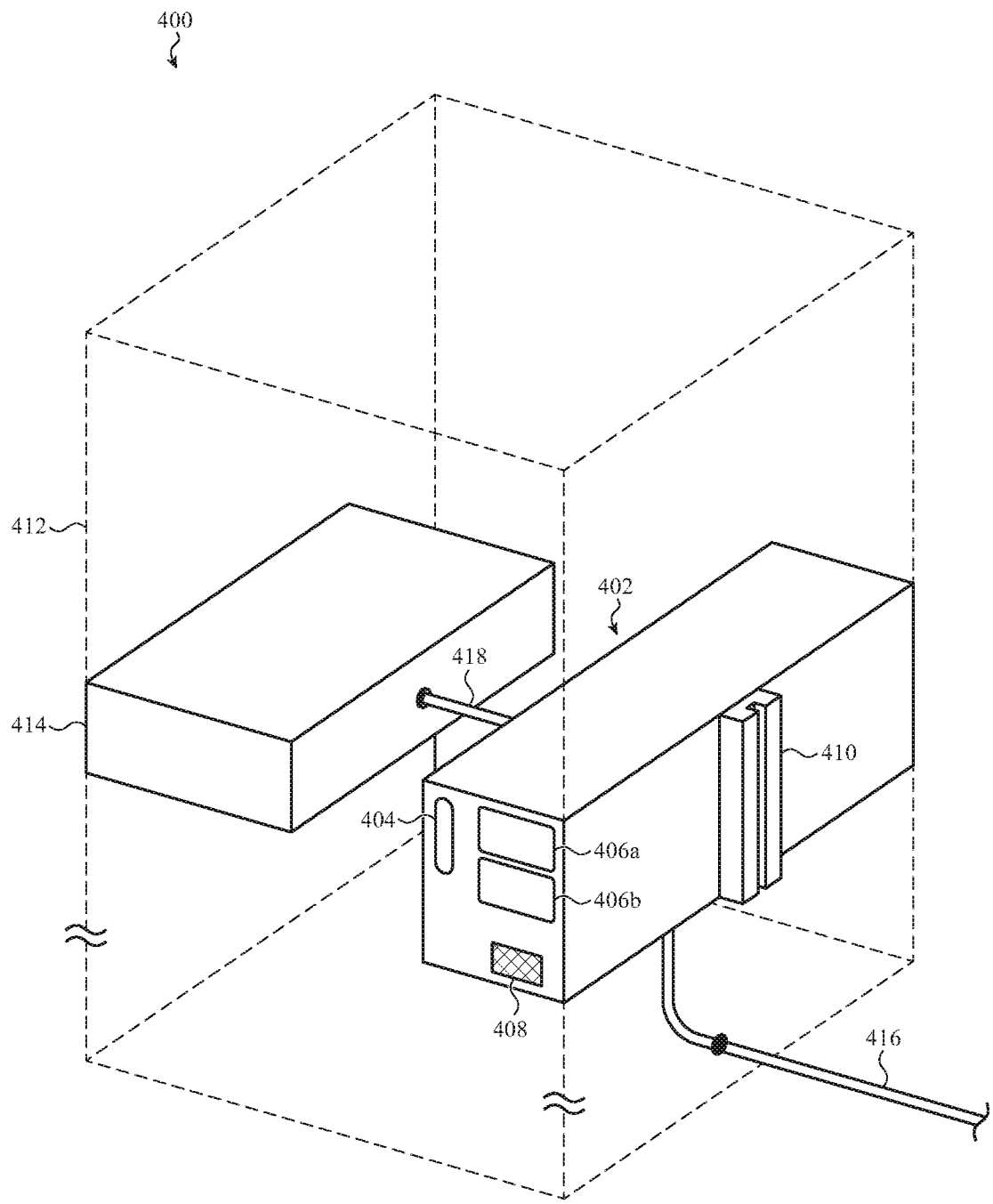
FIG. 4A shows a configuration of a casino gaming device with a credit/debit card reader retrofitted, according to an embodiment.

FIG. 4A shows a configuration 400 for how a credit/debit card reader 402 may be placed within a gaming device 412. It is to be understood that the configuration 400 is exemplary, and intended to show a relationship of the credit/debit card reader 402 to other components in the gaming device 412. Other configurations will be recognized as within the scope of this disclosure.

The gaming device 412 may contain one or more components 414 that may implement various functions of the gaming device 412. These components may include various payment intakes, such as gaming ticket input/outputs, a bill acceptor, a casino chip intake, various electronic computing and communication components, displays for showing the game being played, and the like, described previously. These components may be separated or contained in a single electronic case internal to the gaming device 412.

The credit/debit card reader 402 may be a component separate from the component(s) 414 in order to allow for retrofit into an existing gaming device 412, or for ease of manufacture at the time the gaming device 412 is itself manufactured, or for easier removal for maintenance and/or upgrade.

The credit/debit card reader 402 may include any combination of the features now to be described. The credit/debit card reader 402 may include a card insert reader 404 into which a user may insert a debit or credit card (hereinafter, just "card"). The card insert reader 404 may be configured to read a magnetic strip on the card, or to read information from a chip on the card. Additionally and/or alternatively, the credit/debit card reader 402 may include a magnetic strip reader 410 through which a user may slide a card.

The credit/debit card reader 402 may include, or be connected to, a touchpad 406a into which a user may enter information. The touchpad 406a may be implemented as a keypad with physical buttons, such as keypad section 310, or may be implemented as a touch screen display. The credit/debit card reader 402 may include, or be connected to, a display 406b on which information may be displayed to the user. The touchpad 406a and the display 406b may be a single unit or separate parts of the credit/debit card reader 402. In various embodiments, the touchpad 406a and/or the display 406b may be separate components of an electronic gaming device, and connected (such as by wires, electro-optical means, or other connections) to the credit/debit card reader 402. For example, the touchpad 406a may be presented visually on a touch-enabled display screen of an electronic gaming machine, such as described previously in regard to the gaming display screen 179 of the gaming device 172 shown in FIG. 1D.

The credit/debit card reader 402 may optionally include a visual reader 408 operable to read a QR code symbol or other visual inputs from a user. The credit/debit card reader 402 may also include an antenna (not shown) operable to detect and receive near field electromagnetic signals, such as from a cellphone app that connects to a user's banking account.

The credit/debit card reader 402 may include a first communication link 418 to other components 414 of the gaming device 412, such as to a processor or a computing unit of the gaming device. Such a computing unit may maintain a user's gaming account and update it based on a validated charge to the user's debit account. The credit/debit card reader 402 may transmit over the communication link an alert message that an invalid attempt to charge a card has been made. In one example, this may occur after a card has been reported stolen. The alert message may direct the computing unit of the gaming device 412 to alert security personnel of the casino without making the unauthorized user aware of the alert. The first communication link 418 may be a physical connection, such as twisted pair wires, serial or parallel cable, coax cable, fiber optic cable or another physical connection. Alternatively, the first communication link 418 may be a wireless electromagnetic transmission link, such as by WiFi, a laser optic link, or another electromagnetic technology.

The credit/debit card reader 402 may include a second communication link 416 that connects to a credit or debit card validation service, such as the validation service 108 described previously. The second communication link 416 may be distinct from the first communication link 418. Embodiments in which the second communication link 416 is distinct from the first communication link 418 may allow for resistance to hacking or other types of computer program attacks on the gaming device 412 by separating or "encapsulating" a user's electronic access to his or her debit card account from access to a casino's network. The second communication link 416 may be a physical connection, such as a fiber optic cable or another type, or combination of types, of physical link. The second communication link 416 may also use, either completely or in part, a wireless electromagnetic transmission link.

Figure 4B:
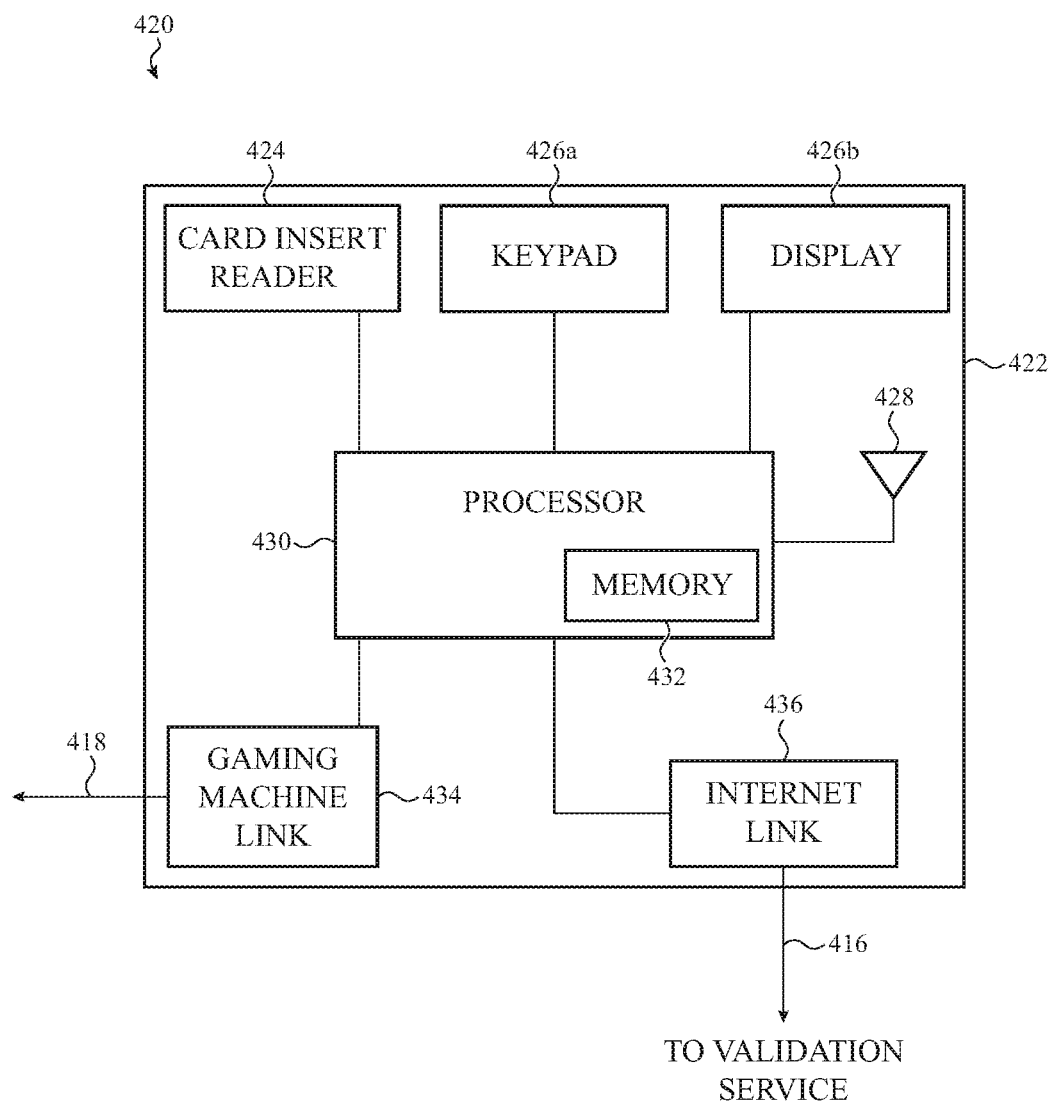
FIG. 4B shows a block diagram of components of a credit/debit card reader that may be included within a casino gaming device, according to an embodiment.

FIG. 4B shows a block diagram 420 of components that may be included in a credit/debit card reader 422 that is configured to be included as a part of an electronic gaming device. The credit/debit card reader 422 may include a card/chip/RFID (radio frequency identification component) reader 424 into which a user may insert a debit or credit card (or just "card") to make a charge request to the account of that card. The card/chip/RFID reader 424 may include an opening in the exterior of credit/debit card reader 422. The card/chip/RFID reader 424 may have internal components configured to read information regarding the account from any of a magnetic strip, a RFID component, or an integrated circuit chip on the card. The information may include the card's account number and other user information, as well as privacy protections.

The credit/debit card reader 422 may also include a keypad 426a and a display 426b. The keypad 426a and the display 426b may be separate devices or a combined unit, such as a touchpad on which icons are displayed at locations for the user to press or touch. A user may enter information on the keypad 426a, which may include a standard numeric keypad, an alphabetic keyboard, or buttons for other types of input. The display 426b may show information to the user, such as information regarding entries made on the keypad 426a, prompts for further entries, or other information.

The credit/debit card reader 422 may also include a wireless receiver 428 operable to receive wireless transmissions from a user's mobile communication device, such as a smartphone, smart watch, or the like. Such transmissions from the user's mobile communication device may be charge requests. The wireless receiver 428 may also include, or be part of, a wireless transmitter/receiver component operable also to transmit wireless signals to the user's mobile communication device.

The credit/debit card reader 422 may include a processor 430 and a memory 432. The memory 432 may a component of the processor 430 or a separate component communicatively linked with the processor 430. The memory may be a non-transitory memory, such as disk, ROM, non-volatile RAM, or another form of non-transitory memory. The processor 430 may be operably linked with the card/chip/RFID reader 424, the keypad 426a, the display 426b, and the wireless receiver 428, and configured to control their operations.

In an example, the processor 430 may receive inputs or signals from either the card/chip/RFID reader 424 or the wireless receiver 428 that contain a charge request from a user to charge an amount to the user's credit or debit accounts. The processor 430 may then execute instructions that cause the display 426b to show a message to the user to enter needed information using the keypad 426a, such as an amount to be charged, a PIN code, or other information. Such a dialog may continue until the processor has received sufficient information to transmit a completed charge request to a validation service.

To transmit a charge request to the validation service, the processor 430 may connect to an internet link component 436 in the credit/debit card reader 422 that can format the charge request (or other information) and transmit it over the internet communication link 416 to the validation service. The internet link 436 may also be operable to receive signals on the internet communication link 416 and format the information for use by the processor 430.

In the case the validation service sends a reply that the charge request is valid, the processor 430 may cause the display 426b to show a corresponding message. The processor 430 may then use a gaming machine link component 434 to transmit a message over the first communication link 418 to a computing unit of a gaming machine, such as gaming device 412. The computing unit of the gaming machine may then credit the user's wagering or betting account available for use for wagers on the gaming machine.

In the case the validation service sends a reply that the charge request is not valid, the processor 430 may, in some cases, cause the display 426b to indicate a corresponding message, such as there is insufficient funds in the user's debit card account to authorize the charge request. In still other cases, such as when the card has been reported lost or stolen to the validation service, the processor 430 may instead send an alert message using the gaming machine link 434 to the computing unit of the gaming machine. The gaming machine may then send a corresponding alert to security personnel of the casino operating the gaming machine.

The foregoing embodiments depicted in the figures referenced above and the various alternatives thereof and variations thereto are presented, generally, for purposes of explanation, and to facilitate an understanding of various configurations and constructions of a network architecture that facilitates communication by and between various components of a banknote handling system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein—including private financial data—will preferably comply with published and industry-established privacy, data, and network security policies and practices. For example, it is understood that data and/or information obtained from remote or local data sources—only on informed consent of the subject of that data and/or information—should be accessed and/or aggregated only for legitimate, agreed-upon, and reasonable uses.

The invention claimed is:

1. A gaming funds transaction device, comprising:
a first section that includes:
a credit/debit card reader;
a printer component operable to print and eject a gaming ticket; and
a processor operably linked with the credit/debit card reader and the printer component, and operable to exchange messages over a communication link with a validation service;
a keypad section that includes:
a numeric keypad;
operational keys; and
a display;
and
a first rigid connection arm and second rigid connection arm linking the first section and the keypad section, said second rigid connection arm movably connected to said first rigid connection arm at one end and said keypad section at a second end permitting the keypad section to be positionally adjusted;
wherein:
the first rigid connection arm and second rigid connection arm contain an electronic link between the keypad section and the first section; and
the processor is operable to:
receive entries from the keypad section through the electronic link;
transmit instructions to the keypad section through the electronic link that cause the display to show respective responses to the entries;
obtain a validation response from the validation service of a charge request received from the credit/debit card reader to apply as a first cash value to the gaming ticket; and
cause the printer component to print and eject the gaming ticket having a second cash value correlated to the charge request.

2. The gaming funds transaction device of claim 1, further comprising a view shield extending from the keypad section.

3. The gaming funds transaction device of claim 1, further comprising a directional viewing screen on the keypad section.

4. The gaming funds transaction device of claim 1, wherein the first rigid connection arm includes a flexible section that extends through a housing of the gaming funds transaction device.

5. The gaming funds transaction device of claim 1, wherein:
the first section further comprises a cash acceptor operably linked with the processor; and
the processor is further operable to apply to the first cash value of the gaming ticket an amount related to monies received in the cash acceptor.

6. The gaming funds transaction device of claim 1, wherein:

the first section further comprises a gaming ticket acceptor operably linked with the processor and configured to accept a used gaming ticket; and the processor is further operable to apply to the gaming ticket an amount related to a residual cash value of the used gaming ticket.

7. The gaming funds transaction device of claim 1, wherein the processor is further operable to:

receive an invalidation response from the validation service of the charge request; and transmit to the keypad section a corresponding instruction for the display to show a message related to the invalidation response.

8. The gaming funds transaction device of claim 1, wherein the processor is further operable to exchange information regarding the second cash value of the gaming ticket with an accounting service separate from the validation service.

9. A gaming funds transaction device, comprising:

a credit/debit card reader;

a printer operable to print and eject a gaming ticket; and a processor operably linked with the credit/debit card reader and the printer component, and operable to exchange messages over a communication link with a validation service;

a keypad including a numeric keypad, operational keys, and a display;

a first rigid connection arm and second rigid connection arm linking the credit/debit card reader and/or printer component with the keypad, said second rigid connection arm movably connected to said first rigid connection arm at one end and said keypad at a second end permitting the keypad to be positionally adjusted; and wherein the first rigid connection arm and second rigid connection arm contain an electronic link between the keypad and/or the credit/debit card reader and/or printer; and the processor further operable to:

receive entries from the keypad through the electronic link;

transmit instructions to the keypad through the electronic link causing the display to show respective responses to the entries;

obtain a validation response from the validation service of a charge request received from the credit/debit card reader to apply as a first cash value to the gaming ticket; and cause the printer to print and eject the gaming ticket having a second cash value correlated to the charge request.

10. The gaming funds transaction device of claim 9, further comprising a view shield extending from the keypad section.

11. The gaming funds transaction device of claim 9, further comprising a directional viewing screen on the keypad section.

12. The gaming funds transaction device of claim 9, wherein the first rigid connection arm includes a flexible section that extends through a housing of the gaming funds transaction device.

13. The gaming funds transaction device of claim 9, wherein:

the first section further comprises a cash acceptor operably linked with the processor; and the processor is further operable to apply to the first cash value of the gaming ticket an amount related to monies received in the cash acceptor.

14. The gaming funds transaction device of claim 9, wherein:

the first section further comprises a gaming ticket acceptor operably linked with the processor and configured to accept a used gaming ticket; and the processor is further operable to apply to the gaming ticket an amount related to a residual cash value of the used gaming ticket.

15. The gaming funds transaction device of claim 9, wherein the processor is further operable to:

receive an invalidation response from the validation service of the charge request; and transmit to the keypad section a corresponding instruction for the display to show a message related to the invalidation response.

16. The gaming funds transaction device of claim 9, wherein the processor is further operable to exchange information regarding the second cash value of the gaming ticket with an accounting service separate from the validation service.

* * * * *